US010065806B2

(12) United States Patent
DeVries et al.

(10) Patent No.: US 10,065,806 B2
(45) Date of Patent: Sep. 4, 2018

(54) DIVERTER FOR SORTER AND METHOD OF DIVERTING

(71) Applicant: Dematic Corp., Grand Rapids, MI (US)

(72) Inventors: Jeffrey S. DeVries, Grand Rapids, MI (US); Martin J. Stanish, Grand Rapids, MI (US); Thomas H. Triesenberg, Rockford, MI (US); Randall J. Carlson, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 15/663,028

(22) Filed: Jul. 28, 2017

(65) Prior Publication Data

US 2018/0037420 A1 Feb. 8, 2018

Related U.S. Application Data

(60) Provisional application No. 62/371,379, filed on Aug. 5, 2016.

(51) Int. Cl.
*B65G 47/84* (2006.01)
*B65G 19/02* (2006.01)

(52) U.S. Cl.
CPC .......... *B65G 47/844* (2013.01); *B65G 19/02* (2013.01); *B65G 47/845* (2013.01); *B65G 2207/36* (2013.01)

(58) Field of Classification Search
CPC .................. B65G 47/844; B65G 47/845
See application file for complete search history.

(56) References Cited

U.S. PATENT DOCUMENTS

| 2,722,396 A | 11/1955 | Carr |
| 4,289,996 A * | 9/1981 | Barnes ................ F16H 25/205 318/38 |
| 4,711,341 A | 12/1987 | Yu et al. |
| 4,817,779 A | 4/1989 | Beck et al. |
| 4,895,242 A | 1/1990 | Michel |

(Continued)

FOREIGN PATENT DOCUMENTS

| JP | 61-24500 | 7/1986 |
| JP | 8-319022 | 12/1996 |

OTHER PUBLICATIONS

International Search Report and Written Opinion of the International Searching Authority from corresponding Patent Cooperation Treaty (PCT) Application No. PCT/IB2017/054636, indicated completed on Nov. 16, 2017.

(Continued)

*Primary Examiner* — Thomas Randazzo
(74) *Attorney, Agent, or Firm* — Gardner, Linn, Burkhart & Ondersma, LLP

(57) ABSTRACT

A plurality of diverters each selectively divert at least one article moving member having a diverting member from a non-diverting path extending longitudinally along said sorter to a diverting rails in a diverting state. At least one of the diverters has a gate having a diverting surface. The gate is selectively rotatable between the diverting state and a non-diverting state about a generally horizontal axis. An actuator moves the gate between the non-diverting state and the diverting state. The actuator is an electrically operated rotary actuator that is rotatable about another generally horizontal axis of rotation.

27 Claims, 11 Drawing Sheets

(56) References Cited

U.S. PATENT DOCUMENTS

| | | | |
|---|---|---|---|
| 5,038,912 A | 8/1991 | Cotter | |
| 5,167,315 A | 12/1992 | Doane | |
| 5,217,105 A | 6/1993 | Sapp et al. | |
| 5,333,715 A * | 8/1994 | Sapp | B65G 47/844 |
| | | | 198/370.02 |
| 5,409,095 A | 4/1995 | Hoshi et al. | |
| 5,441,142 A | 8/1995 | Schneider | |
| 6,139,240 A | 10/2000 | Ando | |
| 6,394,740 B1 * | 5/2002 | Derby | B25J 9/042 |
| | | | 414/744.1 |
| 6,481,559 B1 | 11/2002 | Maeda et al. | |
| 7,357,242 B2 | 4/2008 | Enomoto | |
| 7,549,527 B2 * | 6/2009 | Neiser | B65G 47/844 |
| | | | 198/370.02 |
| 7,553,118 B1 * | 6/2009 | Doepker | B65G 1/08 |
| | | | 198/347.2 |
| 8,469,177 B2 * | 6/2013 | Steenwyk | B65G 47/844 |
| | | | 198/370.02 |
| 2002/0030460 A1 * | 3/2002 | Inui | H02P 8/40 |
| | | | 318/696 |
| 2003/0132143 A1 | 7/2003 | Cochran et al. | |
| 2006/0070352 A1 | 4/2006 | Mornich | |
| 2006/0175179 A1 * | 8/2006 | Christman | B65B 25/146 |
| | | | 198/436 |
| 2008/0035450 A1 * | 2/2008 | Haan | B65G 47/844 |
| | | | 198/370.02 |
| 2011/0042181 A1 | 2/2011 | Steenwyk et al. | |
| 2014/0311598 A1 * | 10/2014 | Hui | A01C 7/084 |
| | | | 137/556.6 |
| 2016/0325946 A1 * | 11/2016 | Stopper | H01L 21/67736 |
| 2017/0273193 A1 * | 9/2017 | Sari | B65G 43/00 |

OTHER PUBLICATIONS

Oriental Motor: Everything You Need to Know About Stepper Motors. Believed to be published on Feb. 2016.

* cited by examiner

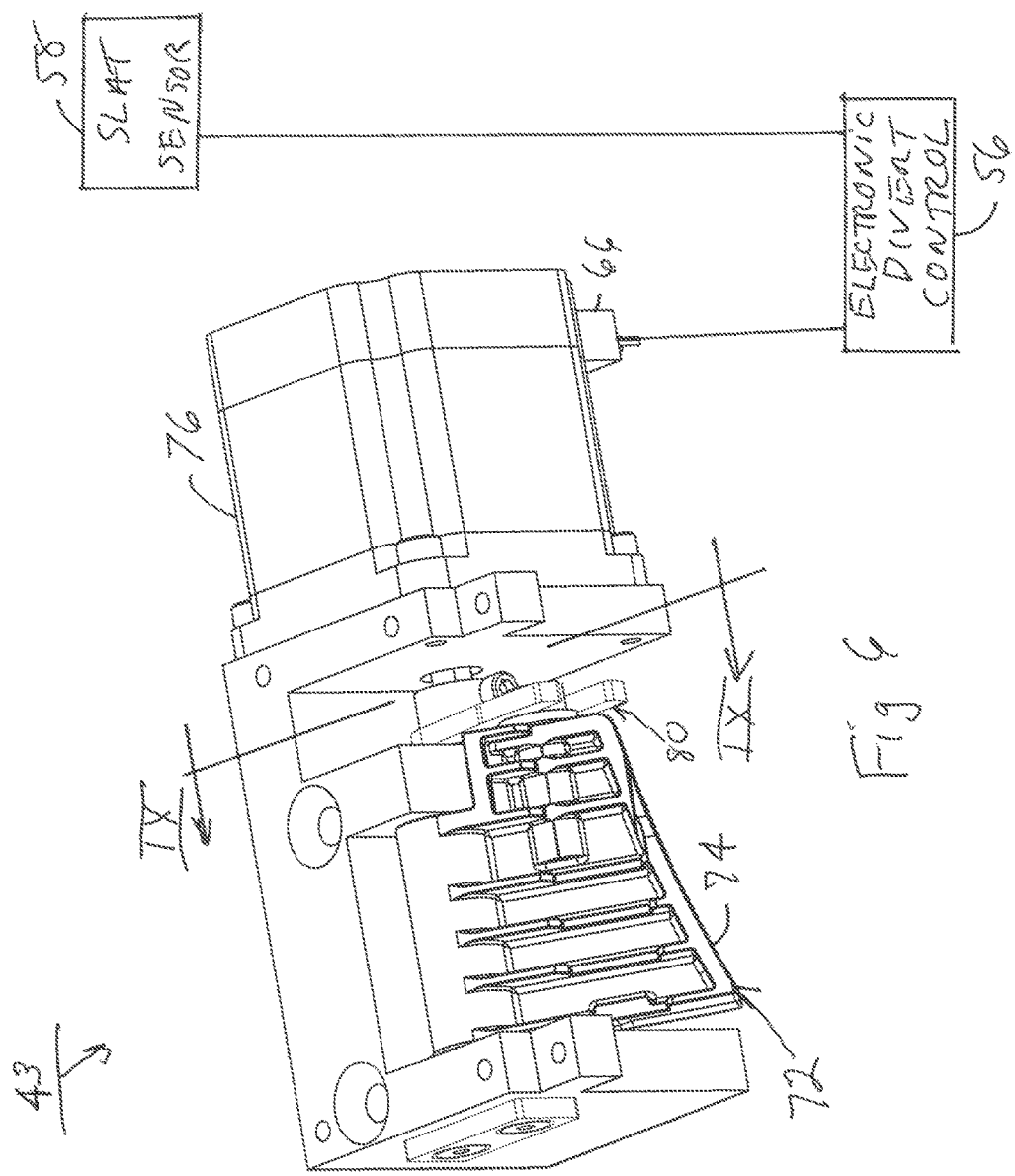

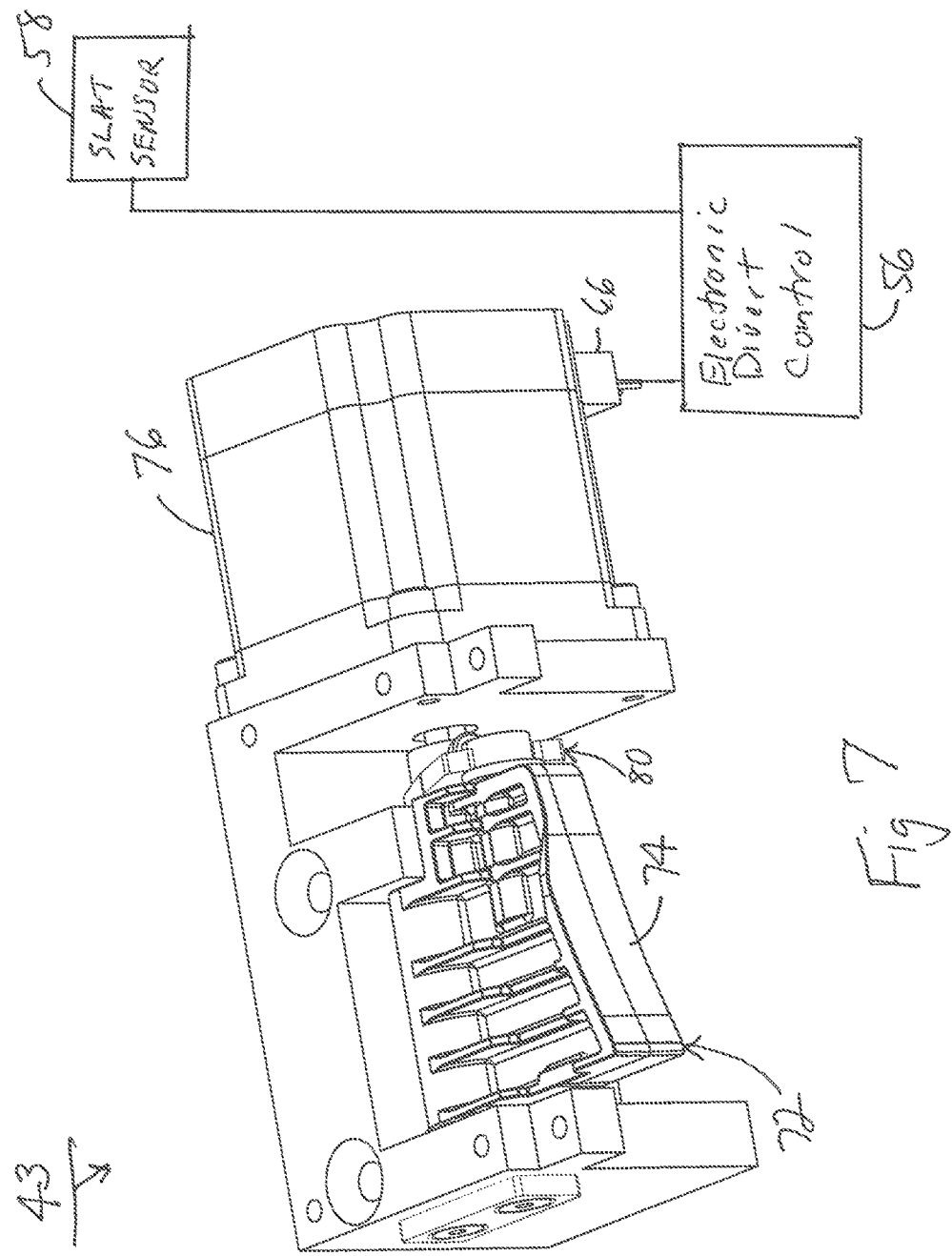

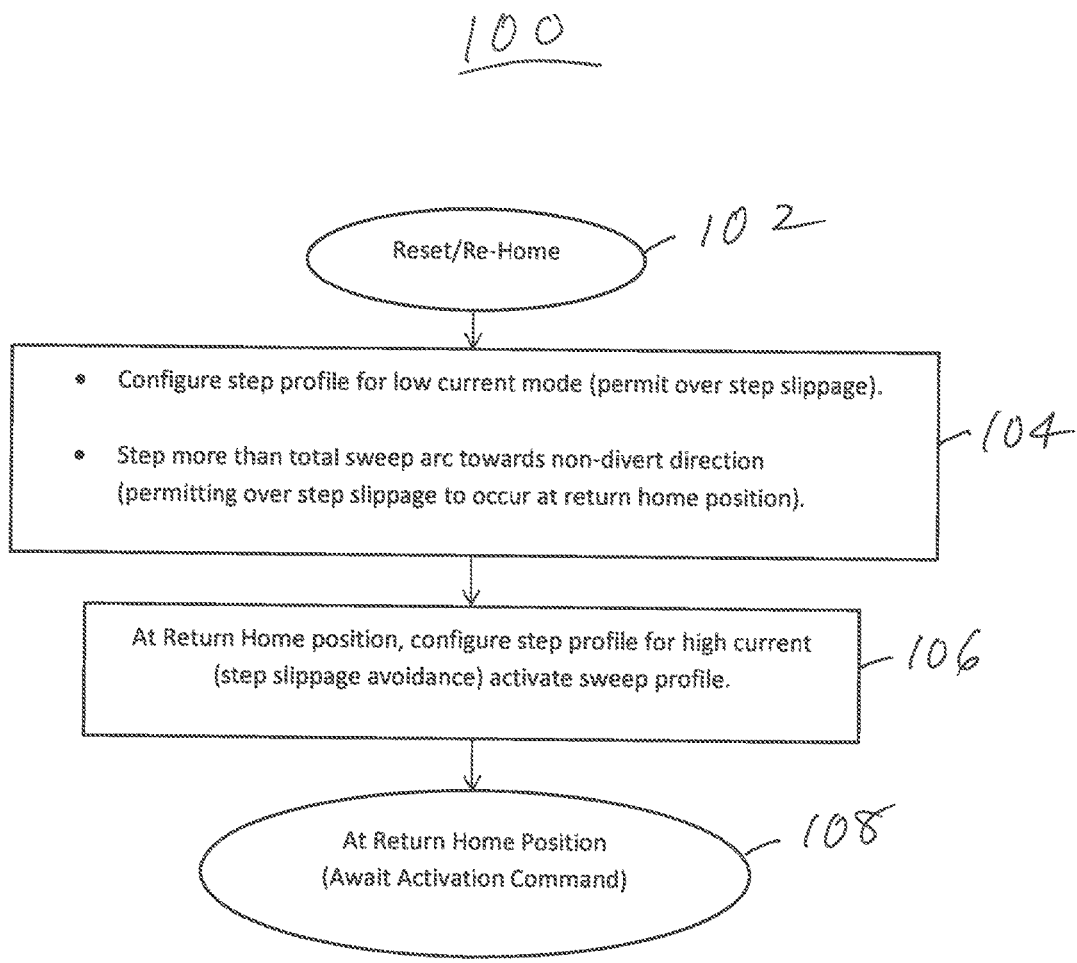

DIVERTER FOR SORTER AND METHOD OF DIVERTING

CROSS-REFERENCE TO RELATED APPLICATIONS

This application claims priority from U.S. patent application Ser. No. 62/371,379, filed on Aug. 5, 2016, the disclosure of which is hereby incorporated herein by reference in its entirety.

BACKGROUND OF THE INVENTION

The present invention is directed to a conveyor system and, in particular, to an article sorter made up of a travelling web which defines a longitudinally travelling conveying surface, a diverter for use with an article sorter, and a method of diverting articles with an article sorter. Diverting members extending below the conveying surface are engaged by a particular diverting rail in order to laterally divert an article travelling on the conveying surface. The diverter selectively transfers one or more of the diverting members to an associated diverting rail to initiate divert of the article.

The invention is useful with a positive displacement sorter in which the web is defined by a series of interconnected laterally elongated slats and having pusher shoes that travel along the slats. An example of such positive displacement sorter and diverter for use with the sorter is disclosed in commonly assigned U.S. Pat. No. 8,469,177, the disclosure of which is hereby incorporated herein by reference in its entirety.

SUMMARY OF THE INVENTION

The present invention facilitates faster sorter speeds which enhances article sortation rates. By enhancing the manner in which the diverter gate is moved between a home position and a divert position and home again and by optimal mechanical design of the diverting module, the diverting module avoids components whose characteristics change with age. Moreover, the operation of the diverting module is coordinated with sorter speed to reduce the likelihood of damage to the sorter and to facilitate faster sorter speeds.

An article sorter, according to an aspect of the invention, includes an endless web that travels in a longitudinal direction defining an article-conveying surface. A plurality of article moving members each having a diverting member extending below the conveying surface and a plurality of diverting rails are below the conveying surface, each capable of engaging the diverting member to divert an article travelling on the conveying surface. A plurality of diverters selectively divert at least one of the diverting members from a non-diverting path extending longitudinally along the sorter to one of the diverting rails in a diverting state. At least one of the diverters includes a gate having a diverting surface and is selectively rotatable between the diverting state and a non-diverting state about a generally horizontal axis. An actuator movies the gate between the non-diverting state and the diverting state. The actuator includes an electrically operated rotary actuator that is rotatable about another generally horizontal axis of rotation. The diverting surface is at a maximum lateral distance from the another generally horizontal axis of rotation when said gate is in said diverting state.

The another generally horizontal axis may be at least as vertically elevated as the diverting member and may defines a common horizontal plane with the diverting member. The diverting member may include a rotary bearing and the gate positions the diverting surface to engage the bearing in the diverting state. The rotary actuator may include a stepper motor.

An article sorter, according to an aspect of the invention, includes an endless web that travels in a longitudinal direction defining an article-conveying surface. A plurality of article moving members each having a diverting member extending below the conveying surface and a plurality of diverting rails are below the conveying surface, each capable of engaging the diverting member to divert an article travelling on the conveying surface. A plurality of diverters selectively divert at least one of the diverting members from a non-diverting path extending longitudinally along the sorter to one of the diverting rails in a diverting state. At least one of the diverters includes a gate having a diverting surface and is selectively rotatable between the diverting state and a non-diverting state about a generally horizontal axis. An actuator movies the gate between the non-diverting state and the diverting state. The actuator includes an electrically operated rotary actuator having a shaft that is rotatable about another generally horizontal axis of rotation. A speed increaser coupled with the shaft and the gate rotates the gate at a higher angular speed than the actuator rotates the shaft.

The another horizontal axis may be offset from the horizontal axis. The speed increaser may include a member having a slot therein that is rotatable with the shaft and a bearing that is connected with the gate riding in the slot. The diverting member may include a rotary bearing wherein the gate positions the diverting surface to engage the bearing in the diverting state. The rotary actuator may be a stepper motor.

An article sorter, according to an aspect of the invention, includes an endless web that travels in a longitudinal direction defining an article-conveying surface. A plurality of article moving members each having a diverting member extending below the conveying surface and a plurality of diverting rails are below the conveying surface, each capable of engaging the diverting member to divert an article travelling on the conveying surface. A plurality of diverters selectively divert at least one of the diverting members from a non-diverting path extending longitudinally along the sorter to one of the diverting rails in a diverting state. At least one of the diverters includes a gate having a diverting surface and is selectively rotatable between the diverting state and a non-diverting state about a generally horizontal axis. An actuator movies the gate between the non-diverting state and the diverting state. The actuator includes an electrically operated rotary actuator that is rotatable about another generally horizontal axis of rotation. An electronic divert control that drives said actuator, wherein the rotary actuator includes a stepper motor and the electronic divert control drives the stepper motor to rotate the gate from the non-diverting state to the diverting state and from the diverting state to the non-diverting state.

The electronic control may apply a holding signal to the stepper motor while the stepper motor positions the gate at the diverting state. The electronic divert control may apply a current mode control signal to the stepper motor to drive the stepper motor in steps from the non-diverting state to the diverting state and from the diverting state to the non-diverting state. The electronic divert control may drive the actuator in an open-loop control routine between the states. The diverting member may be a rotary bearing the gate positions the diverting surface to engage the bearing in the diverting state.

An article sorter, according to an aspect of the invention, includes an endless web that travels in a longitudinal direction defining an article-conveying surface. A plurality of article moving members each having a diverting member extending below the conveying surface and a plurality of diverting rails are below the conveying surface, each capable of engaging the diverting member to divert an article travelling on the conveying surface. A plurality of diverters selectively divert at least one of the diverting members from a non-diverting path extending longitudinally along the sorter to one of the diverting rails in a diverting state. At least one of the diverters includes a gate having a diverting surface and is selectively rotatable between the diverting state and a non-diverting state about a generally horizontal axis. An actuator movies the gate between the non-diverting state and the diverting state. The actuator includes an electrically operated rotary actuator that is rotatable about another axis of rotation. An electronic divert control drives the actuator. The rotary actuator includes a stepper motor and the electronic divert control includes an activation program that drives the stepper motor according to a sweep profile.

The electronic divert control may be responsive to an event and initiate the sweep profile after the event. The web may be defined by a plurality of generally parallel slats. A slat sensor may be responsive to movement of the slats and wherein the event be generated by the slat sensor. The electronic divert control may initiates the sweep profile after a delay from the event. The delay from the event may initiate the sweep profile while the diverting member of a leading or trailing diverting member is at the gate. The endless bed may travel at a variable speed and the delay from the event calculated as a function of the speed of the endless web. The delay from the event may be a function of time required to carry out the sweep profile. The sweep profile may include an activate sweep profile and a home sweep profile. The activation sweep profile drives the stepper motor to move the diverting surface from a home position to a diverting position and the home sweep profile drives the stepper motor to move the diverting surface from the diverting position to the home position. The activating sweep may be initiated no sooner than when a trailing edge of the diverting surface will clear a leading diverting member. The home sweep profile may initiated no later than when a leading edge of the diverting surface will clear a trailing diverting member. A sweep profile may be cancelled if it cannot be carried out without interference with a leading or trailing diverting member. The diverting member may include a rotary bearing wherein the gate positions the diverting surface to engage the bearing in the diverting state.

A diverter for use with an article sorter having an endless web that travels in a longitudinal direction defining an article-conveying surface, a plurality of article moving members each having a diverting member extending below the conveying surface, a plurality of diverting rails below the conveying surface, each of the diverting rails capable of engaging a diverting member to divert an article travelling on the conveying surface and a plurality of diverters, each for selectively diverting at least one of the diverting members from a non-diverting path extending longitudinally along the sorter to one of the diverting rails in a diverting state, according to an aspect of the invention, includes a gate having a diverting surface and is selectively rotatable between the diverting state and a non-diverting state about a generally horizontal axis. An actuator moves the gate between the non-diverting state and the diverting state. The actuator includes an electrically operated rotary actuator that is rotatable about another generally horizontal axis of rotation. The diverting surface is at a maximum lateral distance from the another generally horizontal axis of rotation when the gate is in the diverting state.

A diverter for use with an article sorter having an endless web that travels in a longitudinal direction defining an article-conveying surface, a plurality of article moving members each having a diverting member extending below the conveying surface, a plurality of diverting rails below the conveying surface, each of the diverting rails capable of engaging a diverting member to divert an article travelling on the conveying surface and a plurality of diverters, each for selectively diverting at least one of the diverting members from a non-diverting path extending longitudinally along the sorter to one of the diverting rails in a diverting state, according to an aspect of the invention, includes a gate having a diverting surface and is selectively rotatable between the diverting state and a non-diverting state about a generally horizontal axis. An actuator moves the gate between the non-diverting state and the diverting state. The actuator includes an electrically operated rotary actuator having a shaft that is rotatable about another generally horizontal axis of rotation. A speed increaser coupled with the shaft rotates the gate at a higher angular speed than the actuator rotates the shaft.

A method of sorting articles with an article sorter having an endless web that travels in a longitudinal direction defining an article-conveying surface, a plurality of article moving members each having a diverting member extending below the conveying surface, a plurality of diverting rails below the conveying surface, each of the diverting rails capable of engaging a diverting member to divert an article travelling on a conveying surface, a plurality of diverters, each for selectively diverting at least one of the diverting members from a non-diverting path extending longitudinally along the sorter to one of the diverting rails in a diverting state, at least one of said diverters including a gate having a diverting surface and selectively rotatable between the diverting state and a non-diverting state, according to an aspect of the invention, includes moving the gate between the non-diverting state and the diverting state with an actuator including an electrically operated rotary actuator that is rotatable about another axis of rotation, wherein the rotary actuator includes a stepper motor. Driving the stepper motor to rotate the gate from the non-diverting state to the diverting state and from the diverting state to the non-diverting state.

A method of sorting articles with an article sorter having an endless web that travels in a longitudinal direction defining an article-conveying surface, a plurality of article moving members each having a diverting member extending below the conveying surface, a plurality of diverting rails below the conveying surface, each of the diverting rails capable of engaging a diverting member to divert an article travelling on a conveying surface, a plurality of diverters, each for selectively diverting at least one of the diverting members from a non-diverting path extending longitudinally along the sorter to one of the diverting rails in a diverting state, at least one of said diverters including a gate having a diverting surface and selectively rotatable between the diverting state and a non-diverting state, according to an aspect of the invention, includes moving the gate between the non-diverting state and the diverting state with an actuator including an electrically operated rotary actuator that is rotatable about another axis of rotation, wherein the rotary actuator includes a stepper motor. Driving the stepper motor with an activation program according to a sweep profile.

These and other objects, advantages and features of this invention will become apparent upon review of the following specification in conjunction with the drawings.

BRIEF DESCRIPTION OF THE DRAWINGS

FIG. 6 is a perspective view of a diverting module and electronic divert control with the diverting surface in a home position;

FIG. 7 is the same view as FIG. 6 with the diverting surface in a diverting position;

FIG. 10 is a flowchart of a reset to home program;

DESCRIPTION OF THE PREFERRED EMBODIMENT

Figure 1:
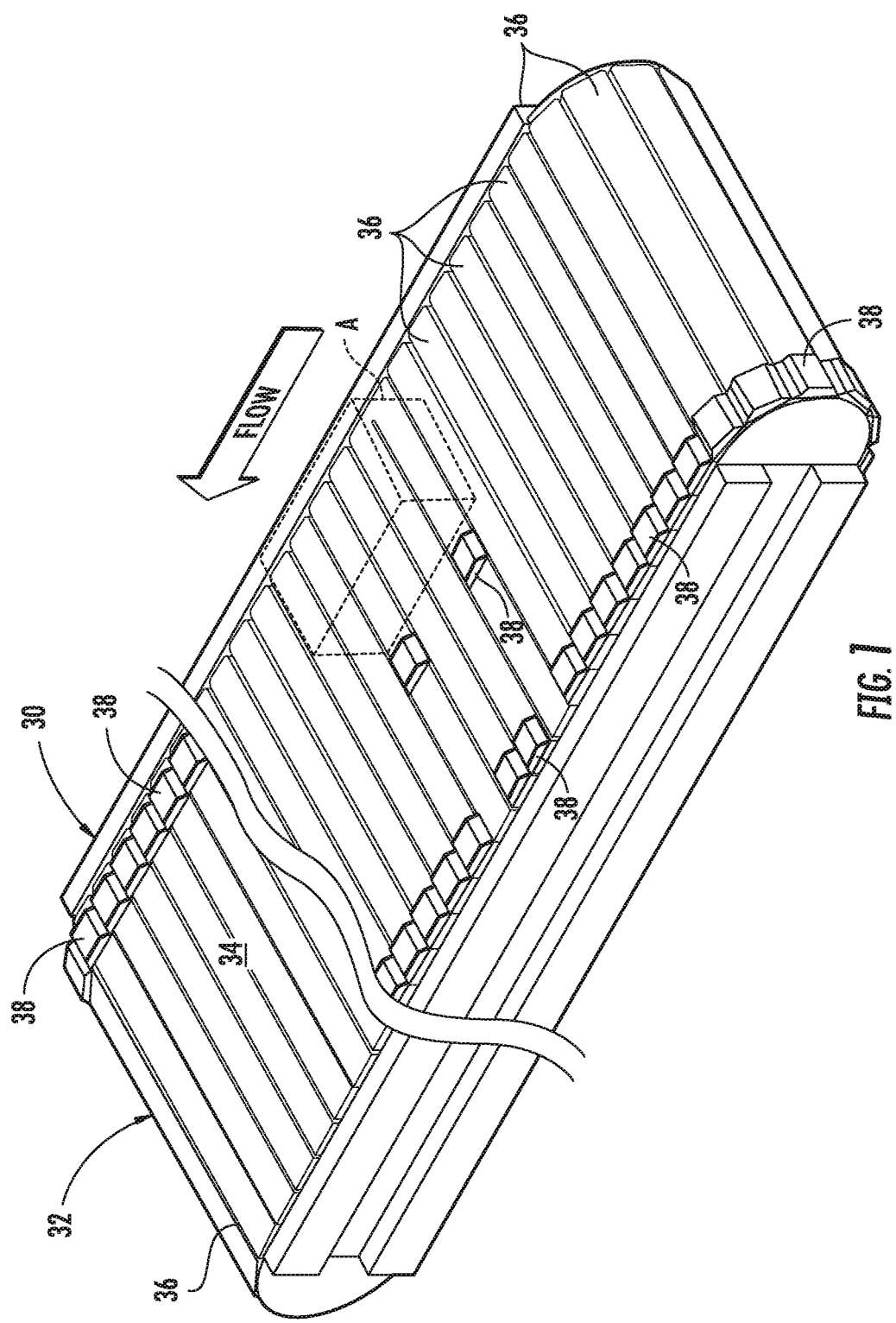
FIG. 1 is a perspective view of a positive displacement sorter useful with the present invention.

Referring now to the drawings and the illustrative embodiments depicted therein, a positive displacement sorter 30 includes an endless web 32 travelling in a longitudinal direction, the upper surface of which defines an article-conveying surface 34 (FIG. 1). Web 32 may be defined by a series of laterally elongated parallel slats 36 interconnected at their ends. A plurality of article moving members such as pusher shoes 38 may be provided to travel along one or more of the slats in order to laterally divert an article A on conveying surface 34, such as to a particular chute (not shown). Sorter 30 may be any type known in the art, such as of the type disclosed in commonly assigned U.S. Pat. Nos. 5,127,510; 6,814,216; 6,860,383; 6,866,136; 7,086,519; 7,117,988; 7,513,356; 7,240,781; 8,469,177 and 8,820,520, the disclosures of which are hereby incorporated herein by reference.

Figure 2:
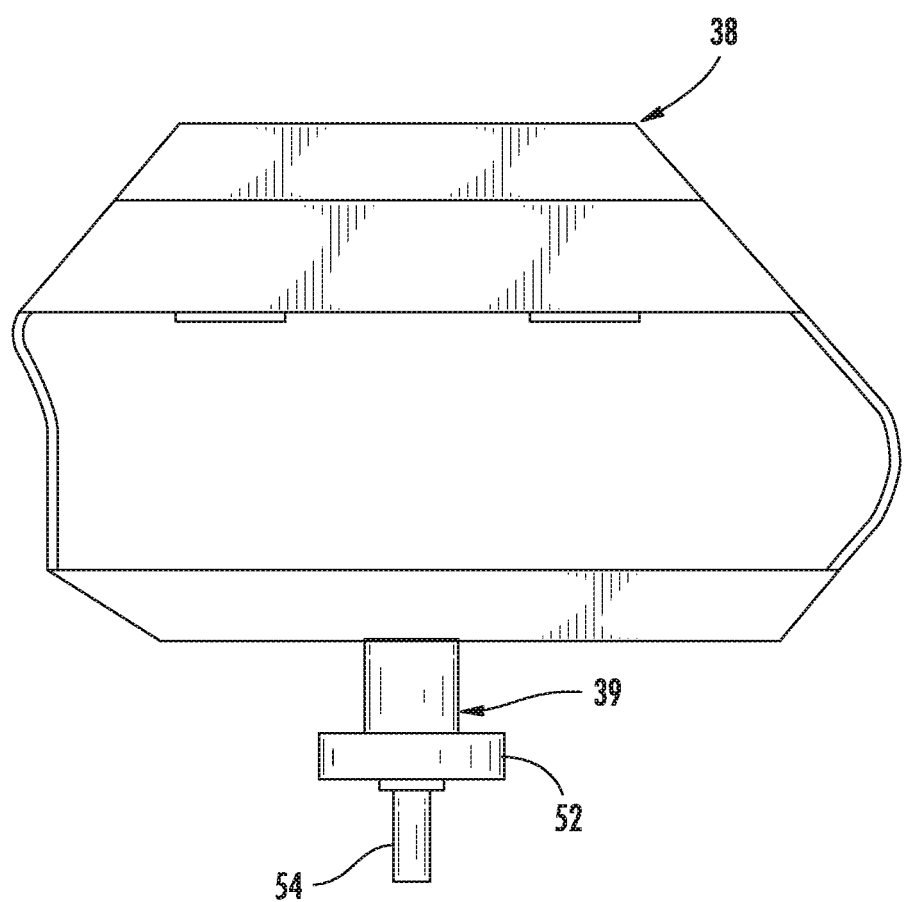
FIG. 2 is a side elevation of a pusher shoe used with the sorter in FIG. 1.

Each of shoes 38 includes a diverting member 39 extending below conveying surface 34 in order to laterally displace the pusher shoe, as will be described in more detail below (FIG. 2). Diverting member 39 may include a bearing 52 and a pin 54 extending coaxially below the bearing. Alternatively, diverting member 39 may drive an article moving member such as a laterally oriented belt to divert an article supported by that belt which forms the article conveying surface. Diverting member 39 may be used with an article moving member associated with other diverting techniques presently known in the art or later developed.

Figure 3:
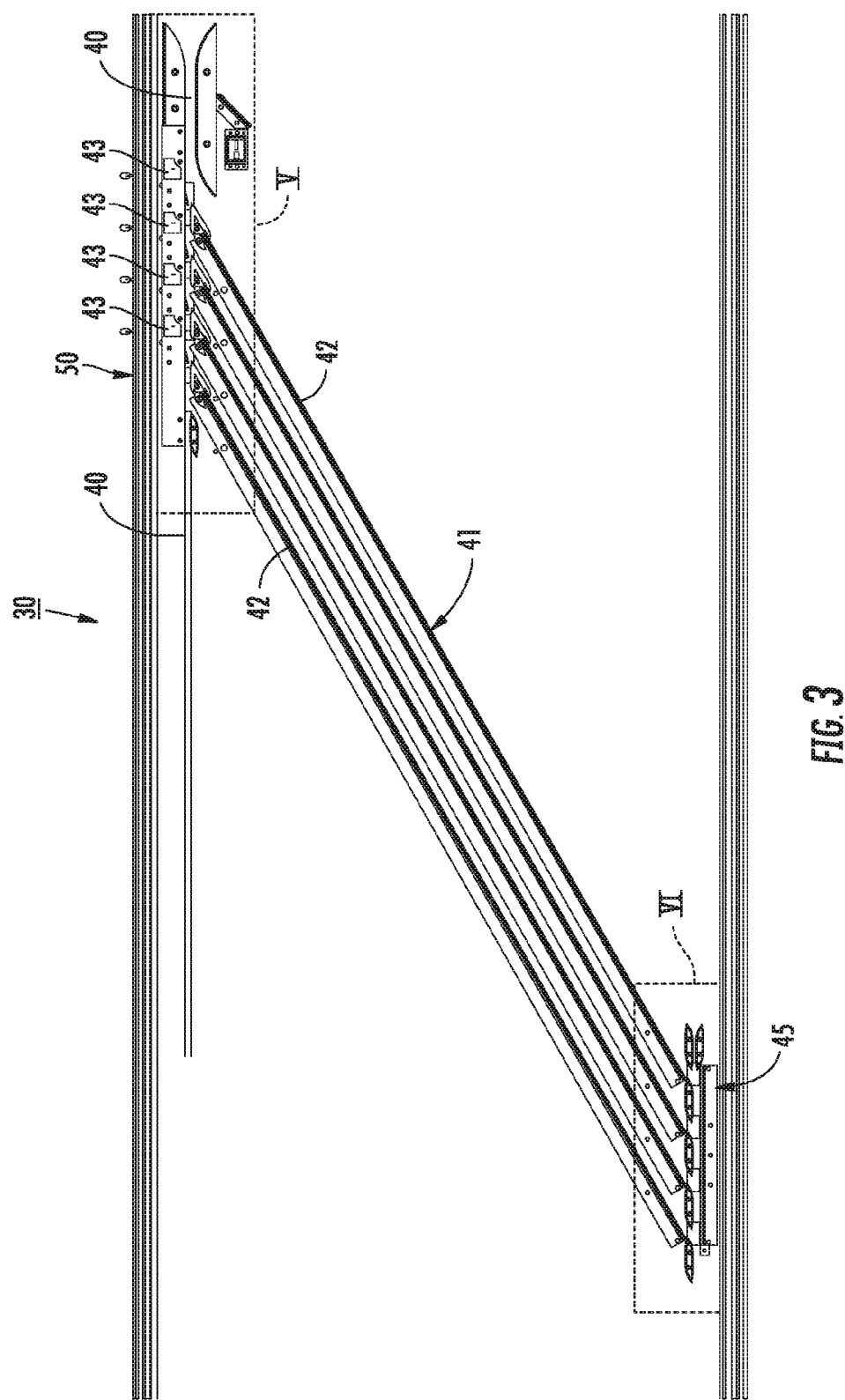
FIG. 3 is a top plan view of a diverting assembly for a takeaway location.
Figure 4:
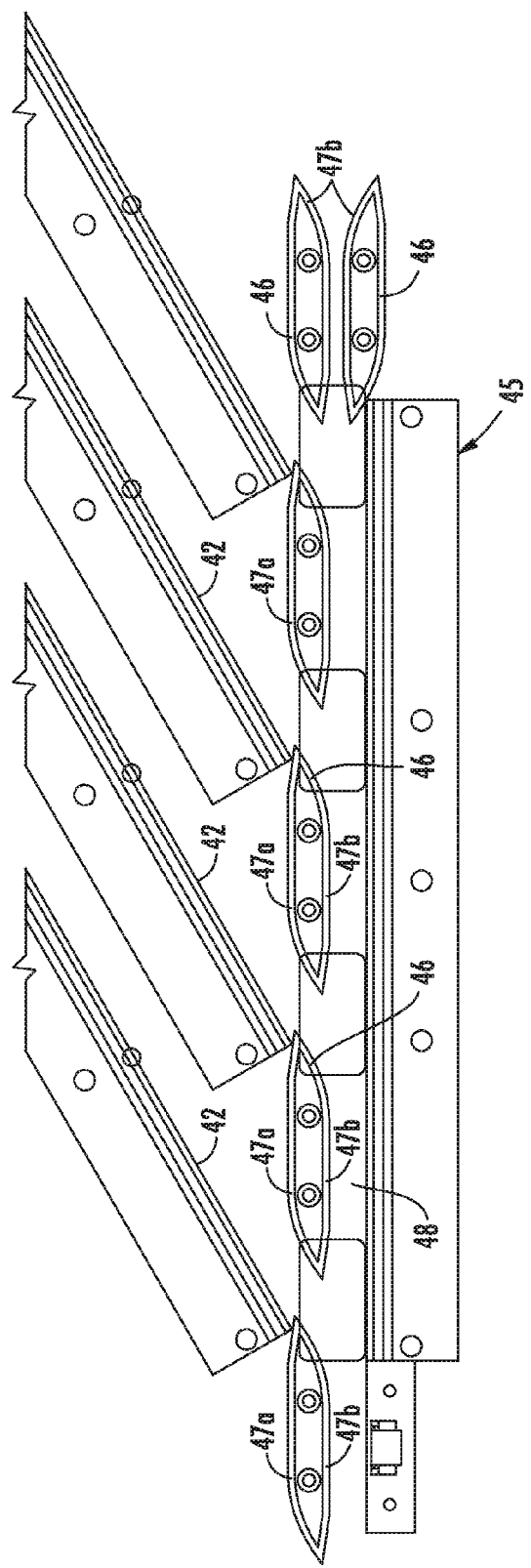
FIG. 4 is an enlarged view of the area indicated at IV in FIG. 3.
Figure 5:
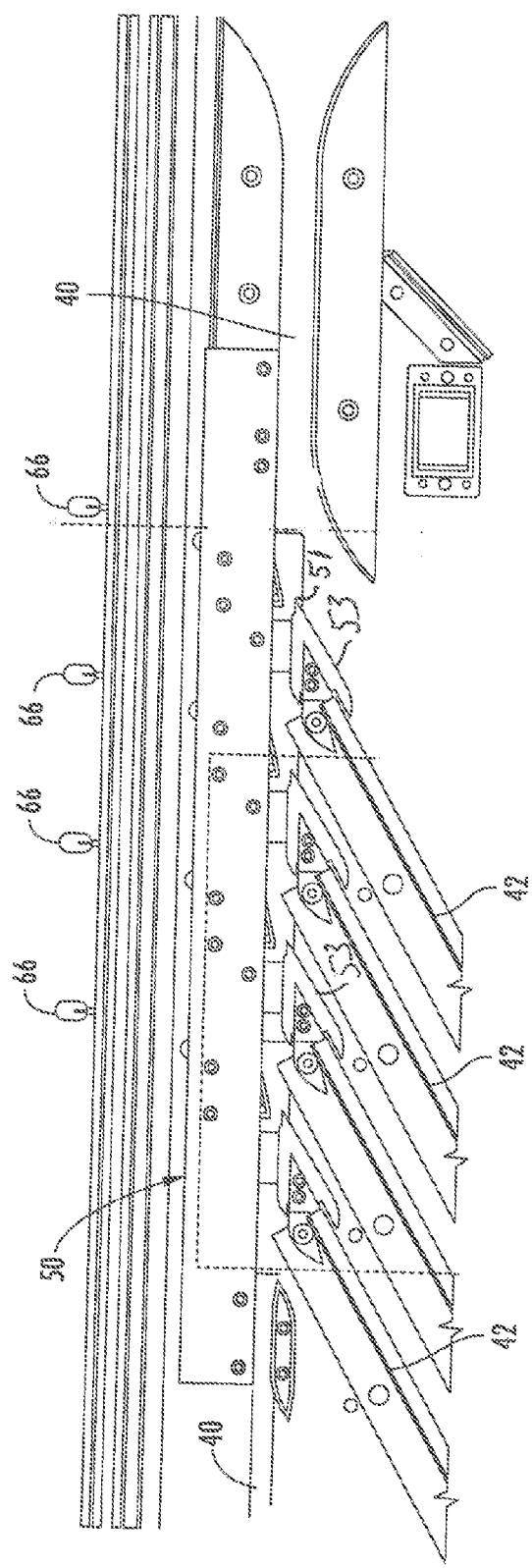
FIG. 5 is an enlarged view of the area indicated at V in FIG. 3.

Sorter 30 further includes a diverting assembly 41 below conveying surface 34 for each divert destination (FIG. 3). Diverting assembly 41 includes a diverter module 50 made up of a plurality of diverters 43 and one or more diverting rails 42 which terminate at a terminal assembly 45. Each diverter 43 is capable of selectively diverting one or more diverting members 39 from a non-diverting path 40, to a diverting rail 42 extending from that diverter assembly in order to cause the associated pusher shoe 38 to travel laterally across conveying surface 34 to thereby laterally displace an article A travelling on the conveying surface. Non-diverting path 40 extends longitudinally along sorter 30 under conveying surface 34 to guide diverting member 39 of shoes until they are diverted. Each of diverting rails 42 is capable of engaging diverting member 39, such as at bearing 52 or, alternatively, at pin 54, to cause the associated shoe 38 to travel laterally to divert an article. Each diverting rail 42 may be combined with a nose 51 having a moveable member 53 that is capable of being deflected if struck head-on by a diverting member 39 of a pusher shoe in a manner that tends to increase the opening to the corresponding diverting rail 42 and thereby completes a partial divert as disclosed in more detail in commonly assigned U.S. Pat. No. 7,798,306, the disclosure of which is hereby incorporated herein by reference.

Terminal assembly 45 includes a series of generally boat-shaped buffers 46 having first surfaces 47a that guide a diverting member 39 travelling along an associated diverting rail 42 to a diverted path 48. Buffers 46 further include a second surface 47b that guide a diverting member 39 travelling along diverted path 48. In the illustrated embodiment, buffers 46 have a symmetrical configuration that allows them to be usefully installed irrespective of orientation. Diverting rails 42 may be made of a structural plastic material, such as Nylon, over a vertical steel support plate to reduce noise and/or expense. The buffers 46 and other portions of diverting assembly 41 may also be made of structural plastic, such as UMHW.

Each diverter 43 is a mechanical diverter that utilizes mechanical force to at least partially divert diverting members 39 in a diverting state from non-diverting path 40 to the associated one of diverting rails 42. A plurality of diverters 43 may be combined in a diverter module 50. Such a diverter module may be used to mount the diverter assemblies and at least a portion of the diverting rails 42 associated with one divert location, such as a chute or takeaway conveyor, if the sorter is a parallel divert sorter. Each diverter 43 includes a gate 72 having a diverting surface 74. Gate 72 is selectively moveable between a diverting orientation or diverting state, illustrated in FIG. 7, and a non-diverting orientation or non-diverting state, illustrated in FIG. 6, by rotation about a generally horizontal axis of rotation 75. Diverting surface 74 is capable of selectively diverting one or more diverting members 39 from non-diverting path 40 to its associated diverting rail 42 when gate 72 is in the diverting state. The position of diverting surface 72 allows one or more diverting members 39 to continue to travel along non-diverting path 40 when gate 72 is in the non-diverting state. In the illustrated embodiment, the gate is formed from a durable polymeric material, such as Delrin, or the like.

Figure 9:
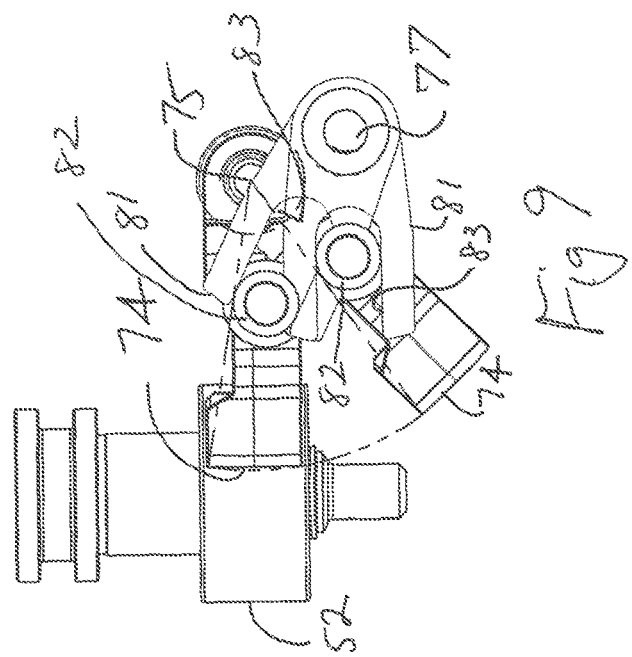
FIG. 9 is a sectional view taken along the lines IX-IX in FIG. 6.

Diverter 43 further includes an actuator 76 that is capable of actuating gate 72 between its non-diverting state and its diverting state. Actuator 76 is a stepper motor having a shaft with a generally horizontal axis of rotation 77. The generally horizontal axis of rotation 75 of the gate is offset from the generally horizontal axis of rotation 77 of the actuator as best seen in FIG. 9. Rotary actuator 76 has an electrical connector 66 for connection with an electronic divert control 56. Gate 72 is rotatably mounted to a shaft 73 to rotate between the diverting and non-diverting orientations about horizontal axis 75. This offset facilitates a speed-increasing joint, or speed increaser, 80 to be provided between rotary actuator 76 and gate 72 so that gate 72 rotates at a higher angular speed than does rotary actuator 76. In the illustrated embodiment, speed increaser 80 is defined by a slot 83 in a member 81 that is rotated by actuator 76 that engages a bearing 82 mounted to gate 72. While member 81 is illustrated as being an arm, it could, alternatively, be a disc or other shape. Bearing 82 is free to move within slot 83 and defines a speed increaser because the bearing moves outwardly in slot 83 as the arm 81 rotates thus increasing the angular speed of the bearing and, hence, the gate with respect to the actuator. Speed increaser 80 also defines a slip joint that resists diverting motion being transferred from gate 72 to rotary actuator 76 to avoid difficulties associated with known mechanical diverters utilizing a rotary actuator having a vertically oriented axis. In such known systems, shock and vibration induced in the diverter from contact by the diverting member can be transferred directly to the rotary actuator, thereby reducing the useful life of the rotary actuator.

Figure 8:
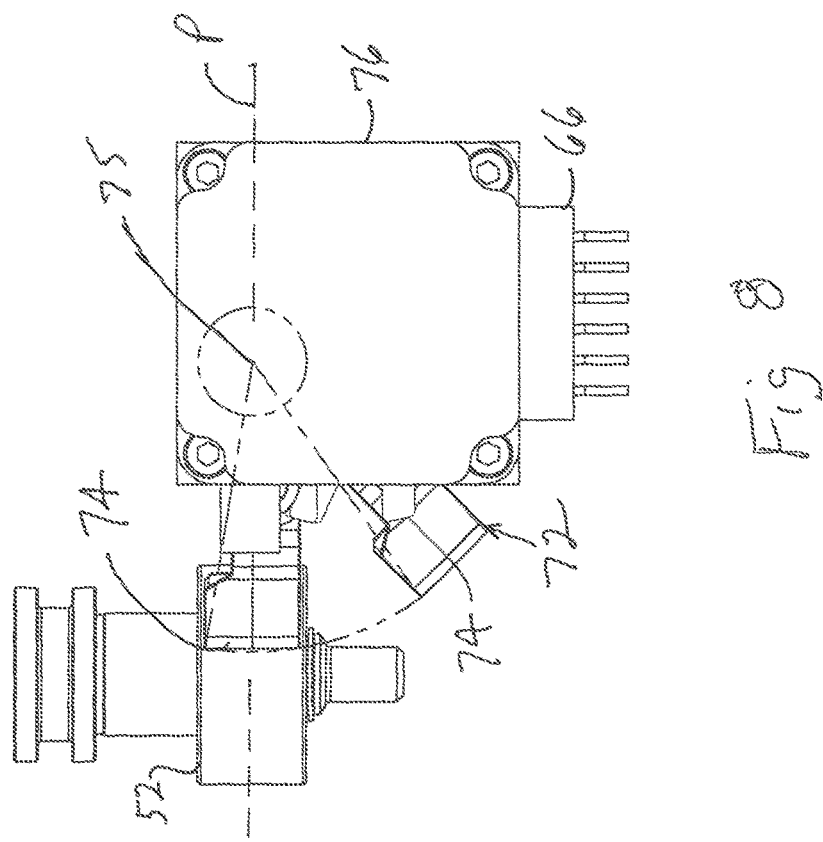
FIG. 8 is an end elevation of the diverting module illustrating movement of the diverting surface with respect to the diverting member of the pusher shoe.

As best seen in FIGS. 8 and 9, diverting surface 74 is at a maximum lateral distance from generally horizontal axis of rotation 75 of the gate when the gate is in the diverting state. The diverting state is with diverting surface 74 adjacent bearing 52. This geometric relationship is accomplished by horizontal axis 75 being at least as vertically elevated as the diverting member, which, in the illustrated embodiment, is bearing 52. This same principle would apply if the diverting member were pin 54. In particular, generally horizontal axis 75 is on a common plane P with bearing 52. This relationship means that diverting surface 74 will be out of the path of travel of bearings 52 whenever it is not in its divert position thereby reducing the likelihood of inadvertent contact with a bearing 52 or pin 54 of a leading or trailing shoe.

As previously set forth, rotary actuator 76 is a stepper motor. Such stepper motor is known in the art and in the illustrated embodiment is a precision stepper motor that is marketed by Vexta. In contrast to prior diverters, electronic divert control 56 drives stepper motor 76 from the non-diverting state, illustrated in FIG. 6, to the diverting state, illustrated in FIG. 7, and from the diverting state to the non-diverting state. Thus, the gate is actively returned to the non-diverting state rather than being returned by a spring or other passive mechanical energy storing member which can change characteristics with age. Furthermore, the divert control 56 controls the stepper motor according to a sweep profile which allows a more rapid precise sweep of the gate thereby allowing a faster speed of the article-conveying surface, as will be described in more detail below. This allows for a higher sortation rate for given package size. Also, by providing a programmed sweep of the gate in both activation to a divert position and return to a home position, mechanical buffers can be eliminated and much more precise timing be provided. Therefore, interference between the gate and diverting shoe's diverting member can be avoided while the gate is in motion. The ability to program divert control 56 to drive stepper motor 76 provides the ability to accurately control the relative position of the gate's sweep with respect to the horizontal movement needed to engage a diverting member of the shoe. Higher diverting speeds can be realized since the motion of the gate can be coordinated with the slats so that there is no interference between the gate and the diverting shoe's diverting member. Divert control 56 can be programmed to carry out a deterministic step profile that provides acceleration, constant velocity, deceleration and brake of the motor shaft to achieve a given arc. Such programming would be within the capability of one ordinary skill in the art. Because electronic divert control 56 drives gate 72 by a stepper motor in an open-loop control routine, the need for monitoring of gate positon by an external sensor is eliminated. The divert position can be achieved by relative offset steps positioning from the homed position of the gate.

Electronic divert control 56 is provided with a timing input from an event generator, such as one or more slat sensors 58. Slat sensor 58 provides an indication of the relative speed of endless web 32, which is driven at a variable speed that takes into account sorter loading, and the like, according to the principles disclosed in commonly assigned U.S. Pat. No. 7,909,155 the disclosure of which is hereby incorporated herein by reference. Slat sensor 58 also detects relative offset positon between the divert gate and position of the targeted divert shoe's pin or bearing by detecting one or both edges of slats 36. While one sensor is illustrated, multiple sensors can be used to provide separate inputs for sorter speed and slat detection. This relative offset can be used as a timing event so that a timing offset can be applied to the start of the activation sweep so that diverting surface 74 is in the full up position before the diverting member of the targeted shoe is at the leading edge of the diverting surface. The firmware of divert control 56 has a mathematical model of the divert gate sweep motion. Thus, for any given speed of endless web 32, an activation offset can be calculated to provide optimum margin of clearance to avoid prior bearing interference and insure that the diverting surface is in diverting position before the arrival of the targeted bearing to be diverted. The coordination of operation of the diverting module and speed of endless web 32 also permits the ability to detect when sorter 30 is above a maximum speed threshold when activation or deactivation of gate 72 would not be possible without interference with a leading or trailing shoe and would prevent activation or deactivation and thus avoid damage to sorter 30 with its associated downtime for repairs.

A reset to home position routine 100 is carried out by divert control 56 upon initiation of the diverter and begins at 102 by configuring a profile at 104 to drive gate 72 to a home position under low current drive that permits the gate to slip when it reaches a mechanical home position (FIG. 10). At the home positon, divert control 56 configures an activation sweep profile at 106. The program then waits at 108 until an activation command is given. When the activation command is given, the motion of gate 72 is determined in time from the profile of the sweep profile.

An adaptive offset time is applied before the activation command is given so that, for higher sorter speeds, sweep activation occurs earlier, while the bearing of the prior shoe is still over the diverting module, without causing interference. Sweep activation is completed prior to the arrival of the desired shoe's control bearing. For example, the adaptive offset can be relative to an event comprising the slat sensor 58 sensing a slat edge and be calculated as the midpoint between this event and the leading edge of the diverting surface being cleared by the prior shoe. When diverting at slow sorter speeds, the activation command to start the sweep action can be set at this midpoint position since there will be adequate time for the gate to sweep to the divert position before the targeted shoe's bearing arrives at the lead edge of the diverting surface. As sorter speeds increase, there will be some sorter speed at which the midpoint target position would fail to complete the sweep before the bearing of the targeted shoe arrives. Thus, by sending the activation command sooner, i.e., having a smaller offset time, the sweep starts sooner with the bearing of the prior shoe over the diverting module but that bearing would clear before the diverting surface is moved to the diverting position. Thus, for any speed of endless web 32, an optimal activation offset can be calculated to provide maximum margin of clearance to avoid interference with the bearing 52 of a prior shoe while ensuring that the gate 72 is in a diverting position before arrival of the bearing of the targeted shoe to be diverted.

Figure 11:
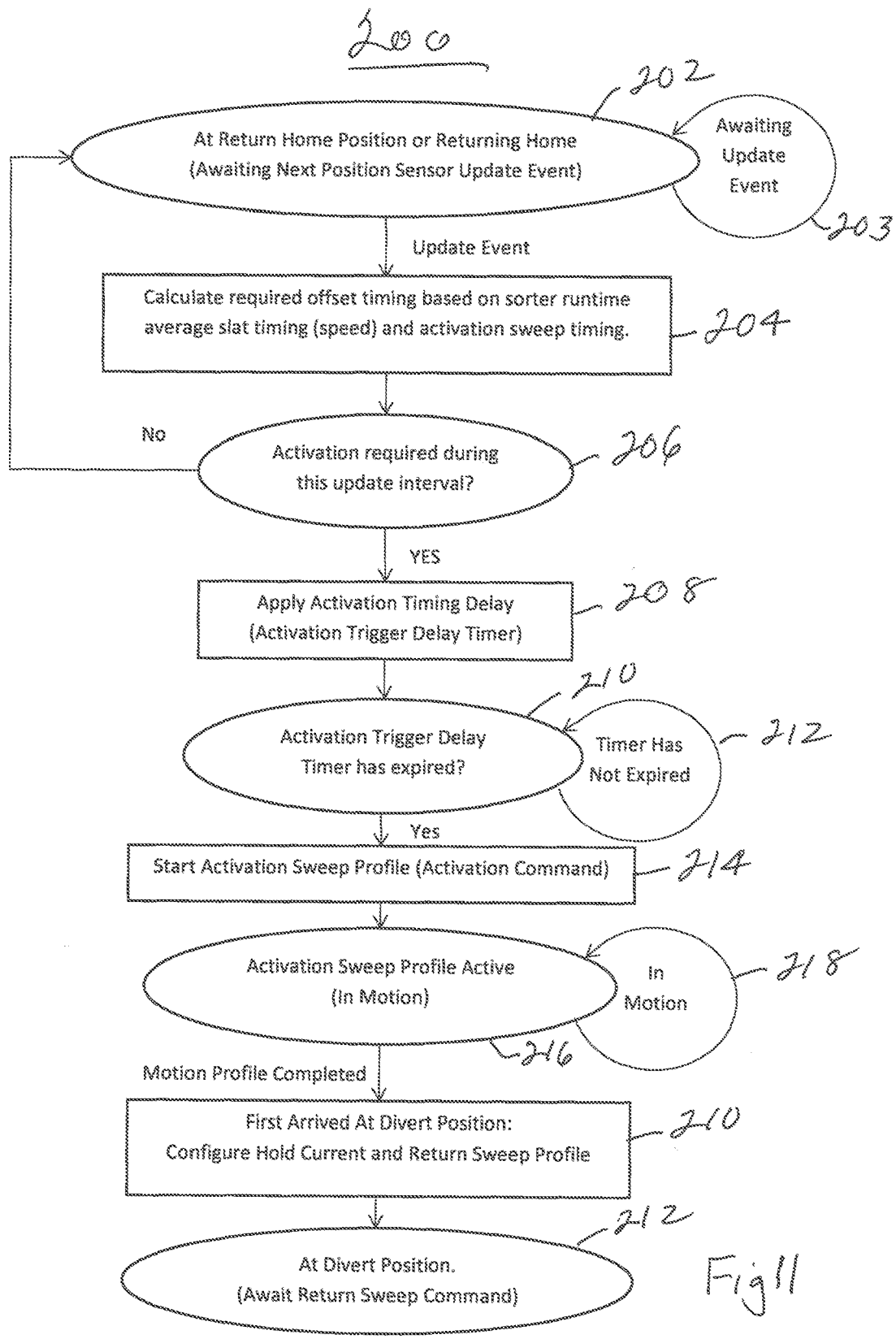
FIG. 11 is a flowchart of an activation sweep program.
Figure 12:
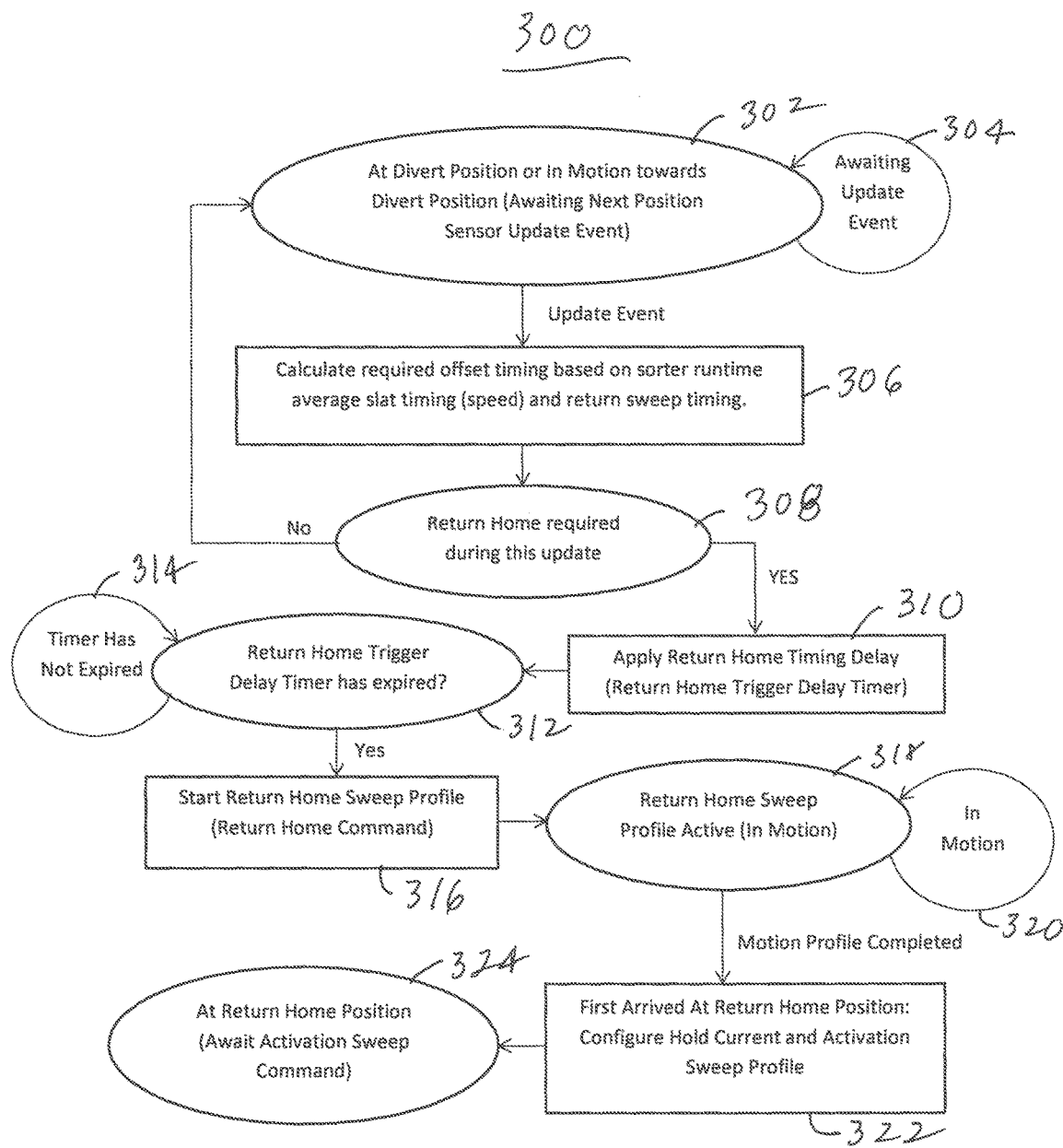
FIG. 12 is a flowchart of return home sweep program.

Electronic divert control 56 is programmed with an activation sweep program 200 (FIG. 11). The program starts with gate 72 in a home position at 202 and waits at 203 for an event signal from slat sensor 58. When the update event occurs, a required offset time is calculated at 204 based on one or more parameters, such as sorter speed, and the timing is built into the activation sweep profile. When it is determined at 206 that the event has occurred, the program begins indexing the offset time at 208 and monitors at 210 for the offset time to expire. When it is determined at 212 that the timer has expired, the sweep activation profile starts at 214 while the program keeps track of the profile at 216. When it is determined at 218 that the activation sweep is complete, divert control 56 applies a hold current to actuator 76 at 210 to hold the diverting surface in the divert position and moves at 212 to a return sweep program 300.

Return home sweep program 300 begins at 302 by divert control 56 monitoring slat sensor 58 for an update event and waits at 304 for the update event to occur. While waiting, the program calculates an offset time at 306 to begin the return sweep. When the update event occurs at 308, the program initiates a timer at 310 that corresponds to the calculated offset time and waits at 314 for the offset time to elapse at 316. The return home sweep program is initiated at 318 and time for the return sweep profile to complete is monitored at 320. When the return sweep profile is complete at 322 to the home position, a hold current is placed on actuator 76 and the software switches to the activation sweep program at 324. One difference between the timing involved in the return sweep program and the activation sweep program is that, at higher sorter speeds, any overlap in timing is between the leading edge of the diverting surface and the bearing of the trailing pusher shoe. It is expected that timing of the return sweep will determine maximum sorter speed.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An article sorter, comprising:
  an endless web that travels in a longitudinal direction defining an article-conveying surface;
  a plurality of article moving members each having a diverting member extending below said conveying surface;
  a plurality of diverting rails below said conveying surface, each of said diverting rails capable of engaging said diverting member to divert an article travelling on said conveying surface;
  a plurality of diverters, each for selectively diverting at least one of said diverting members from a non-diverting path extending longitudinally along said sorter to one of said diverting rails in a diverting state;
  at least one of said diverters comprising a gate having a diverting surface, said gate selectively rotatable between the diverting state and a non-diverting state about a generally horizontal axis;
  an actuator moving said gate between the non-diverting state and the diverting state, said actuator comprising an electrically operated rotary actuator that is rotatable about another generally horizontal axis of rotation; and
  wherein said diverting surface is at a maximum lateral distance from said generally horizontal axis of rotation when said gate is in said diverting state; wherein said diverting surface travels between said diverting state and said non-diverting state substantially out of the non-diverting path of travel of said diverting members.

2. The sorter as claimed in claim 1 wherein said diverting members each comprises a rotary bearing and said gate positions said diverting surface to engage said bearing in the diverting state.

3. The sorter as claimed in claim 1 wherein said rotary actuator comprises a stepper motor.

4. The sorter as claimed in claim 1 wherein said generally horizontal axis is at least as vertically elevated as said diverting members.

5. The sorter as claimed in claim 4 wherein said generally horizontal axis defines a common horizontal plane with said diverting members.

6. An article sorter, comprising:
  an endless web that travels in a longitudinal direction defining an article-conveying surface;
  a plurality of article moving members each having a diverting member extending below said conveying surface;
  a plurality of diverting rails below said conveying surface, each of said diverting rails capable of engaging said diverting member to divert an article travelling on said conveying surface;
  a plurality of diverters, each for selectively diverting at least one of said diverting members from a non-diverting path extending longitudinally along said sorter to one of said diverting rails in a diverting state;
  at least one of said diverters comprising a gate having a diverting surface, said gate selectively rotatable between the diverting state and a non-diverting state about a generally horizontal axis;
  an actuator moving said gate between the non-diverting state and the diverting state, said actuator comprising an electrically operated rotary actuator having a shaft that is rotatable about another generally horizontal axis of rotation; and
  a speed increaser coupled with said shaft and said gate that rotates said gate at a higher angular speed than said actuator rotates said shaft.

7. The sorter as defined in claim 6 wherein said another horizontal axis is offset from said horizontal axis.

8. The sorter as claimed in claim 7 wherein said speed increaser comprises a member having a slot therein that is rotatable with said shaft and a bearing that is connected with said gate riding in said slot.

9. The sorter as claimed in claim 6 wherein said diverting member comprises a rotary bearing wherein said gate positions said diverting surface to engage said bearing in the diverting state.

10. The sorter as claimed in claim 6 wherein said rotary actuator comprises a stepper motor.

11. An article sorter, comprising:
an endless web that travels in a longitudinal direction defining an article-conveying surface;
a plurality of article moving members each having a diverting member extending below said conveying surface;
a plurality of diverting rails below said conveying surface, each of said diverting rails capable of engaging said diverting member to divert an article travelling on said conveying surface;
a plurality of diverters, each for selectively diverting at least one of said diverting members from a non-diverting path extending longitudinally along said sorter to one of said diverting rails in a diverting state;
at least one of said diverters comprising a gate having a diverting surface, said gate selectively rotatable between the diverting state and a non-diverting state;
an actuator moving said gate between the non-diverting state and the diverting state, said actuator comprising an electrically operated rotary actuator that is rotatable about another axis of rotation; and
an electronic divert control that drives said rotary actuator, wherein said rotary actuator comprises a stepper motor and wherein said electronic divert control comprises an activation program that drives said stepper motor to rotate said gate according to a sweep profile from said non-diverting state to said diverting state and from said diverting state to said non-diverting state and against a mechanical home position at said non-diverting state.

12. The sorter as claimed in claim 11 wherein said electronic control applies a holding signal to said stepper motor while said stepper motor positions the gate at said diverting state.

13. The sorter as claimed in claim 11 wherein said electronic divert control applies a current mode control signal to said stepper motor to drive said stepper motor in steps from said non-diverting state to said diverting state and from said diverting state to said non-diverting state.

14. The sorter as claimed in claim 11 wherein said electronic divert control drives said actuator in an open-loop control routine between said states.

15. The sorter as claimed in claim 11 wherein said diverting member comprises a rotary bearing wherein said gate positions said diverting surface to engage said bearing in the diverting state.

16. An article sorter, comprising:
an endless web that travels in a longitudinal direction defining an article-conveying surface;
a plurality of article moving members each having a diverting member extending below said conveying surface;
a plurality of diverting rails below said conveying surface, each of said diverting rails capable of engaging said diverting member to divert an article travelling on said conveying surface;
a plurality of diverters, each for selectively diverting at least one of said diverting members from a non-diverting path extending longitudinally along said sorter to one of said diverting rails in a diverting state;
at least one of said diverters comprising a gate having a diverting surface, said gate selectively rotatable between the diverting state and a non-diverting state;
an actuator moving said gate between the non-diverting state and the diverting state, said actuator comprising an electrically operated rotary actuator that is rotatable about another axis of rotation; and
an electronic divert control driving said rotary actuator, wherein said rotary actuator comprises a stepper motor and wherein said electronic divert control comprises an activation program that drives said stepper motor according to a sweep profile, wherein said electronic divert control is responsive to an event and initiates the sweep profile after the event, wherein said web is defined by a plurality of generally parallel slats and including a slat sensor that is responsive to movement of said slats and wherein the event is generated by said slat sensor, wherein said electronic divert control initiates the sweep profile after a delay from the event, wherein the endless web travels at a variable speed and wherein the delay from the event is calculated as a function of the speed of the endless web.

17. The sorter as claimed in claim 16 wherein the delay from the event initiates the sweep profile while the diverting member of a leading or trailing diverting member is at said gate.

18. The sorter as claimed in claim 16 wherein the delay from the event is further a function of time required to carry out the sweep profile.

19. The sorter as claimed in claim 16 wherein a sweep profile is cancelled if it cannot be carried out without interference with a leading or trailing diverting member.

20. The sorter as claimed in claim 16 wherein said diverting member comprises a rotary bearing wherein said gate positions said diverting surface to engage said bearing in the diverting state.

21. The sorter as claimed in claim 16 wherein the sweep profile includes an activate sweep profile and a home sweep profile, the activation sweep profile driving the stepper motor to move the diverting surface from a home position to a diverting position and the home sweep profile driving the stepper motor to move the diverting surface from the diverting position to the home position.

22. The sorter as claimed in claim 21 wherein the activating sweep is initiated no sooner than when a trailing edge of the diverting surface will clear a leading diverting member.

23. The sorter as claimed in claim 21 wherein the home sweep profile is initiated no later than when a leading edge of the diverting surface will clear a trailing diverting member.

24. A diverter for use with an article sorter having an endless web that travels in a longitudinal direction defining an article-conveying surface, a plurality of article moving members each having a diverting member extending below said conveying surface, a plurality of diverting rails below said conveying surface, each of said diverting rails capable of engaging said diverting member to divert an article travelling on said conveying surface and a plurality of diverters, each for selectively diverting at least one of said diverting members from a non-diverting path extending longitudinally along said sorter to one of said diverting rails in a diverting state, said diverter comprising:
a gate having a diverting surface, said gate selectively rotatable between the diverting state and a non-diverting state about a generally horizontal axis;

an actuator moving said gate between the non-diverting state and the diverting state, said actuator comprising an electrically operated rotary actuator that is rotatable about another generally horizontal axis of rotation; and wherein said diverting surface is at a maximum lateral distance from said generally horizontal axis of rotation when said gate is in said diverting state; wherein said diverting surface travels between said diverting state and said non-diverting state substantially out of the non-diverting of path of said diverting members.

25. A diverter for use with an article sorter having an endless web that travels in a longitudinal direction defining an article-conveying surface, a plurality of article moving members each having a diverting member extending below said conveying surface, a plurality of diverting rails below said conveying surface, each of said diverting rails capable of engaging said diverting member to divert an article travelling on said conveying surface and a plurality of diverters, each for selectively diverting at least one of said diverting members from a non-diverting path extending longitudinally along said sorter to one of said diverting rails in a diverting state, said diverter comprising:

a gate having a diverting surface, said gate selectively rotatable between the diverting state and a non-diverting state about a generally horizontal axis;

an actuator moving said gate between the non-diverting state and the diverting state, said actuator comprising an electrically operated rotary actuator having a shaft that is rotatable about another generally horizontal axis of rotation; and a speed increaser coupled with said shaft rotates said gate at a higher angular speed than said actuator rotates.

26. A method of sorting articles with an article sorter having an endless web that travels in a longitudinal direction defining an article-conveying surface, a plurality of article moving members each having a diverting member extending below said conveying surface, a plurality of diverting rails below said conveying surface, each of said diverting rails capable of engaging said diverting member to divert an article travelling on said conveying surface, a plurality of diverters, each for selectively diverting at least one of said diverting members from a non-diverting path extending longitudinally along said sorter to one of said diverting rails in a diverting state, at least one of said diverters comprising a gate having a diverting surface, said gate selectively rotatable between the diverting state and a non-diverting state, said method comprising:

moving said gate between the non-diverting state and the diverting state with an actuator comprising an electrically operated rotary actuator that is rotatable about another axis of rotation; wherein said rotary actuator comprises a stepper motor; and driving said stepper motor according to an activation program to rotate said gate from said non-diverting state to said diverting state and from said diverting state to said non-diverting state and against a mechanical home position at said non-diverting state.

27. A method of sorting articles with an article sorter having an endless web that travels in a longitudinal direction defining an article-conveying surface, a plurality of article moving members each having a diverting member extending below said conveying surface, a plurality of diverting rails below said conveying surface, each of said diverting rails capable of engaging said diverting member to divert an article travelling on said conveying surface, a plurality of diverters, each for selectively diverting at least one of said diverting members from a non-diverting path extending longitudinally along said sorter to one of said diverting rails in a diverting state, at least one of said diverters comprising a gate having a diverting surface, said gate selectively rotatable between the diverting state and a non-diverting state, said method comprising:

moving said gate between the non-diverting state and the diverting state with an actuator comprising an electrically operated rotary actuator that is rotatable about another axis of rotation, wherein said rotary actuator comprises a stepper motor; and driving said stepper motor with an activation program according to a sweep profile wherein said driving is responsive to an event and the activation program initiates the sweep profile after the event, wherein said web is defined by a plurality of generally parallel slats and including a slat sensor that is responsive to movement of said slats and wherein the event is generated by said slat sensor, wherein the activation program initiates the sweep profile after a delay from the event, wherein the endless web travels at a variable speed and wherein the delay from the event is calculated as a function of the speed of the endless web.

* * * * *